J. BEVERIDGE.
APPARATUS FOR TURNING OVER LEAVES.
APPLICATION FILED AUG. 22, 1908.
910,777.
Patented Jan. 26, 1909.
4 SHEETS—SHEET 1.
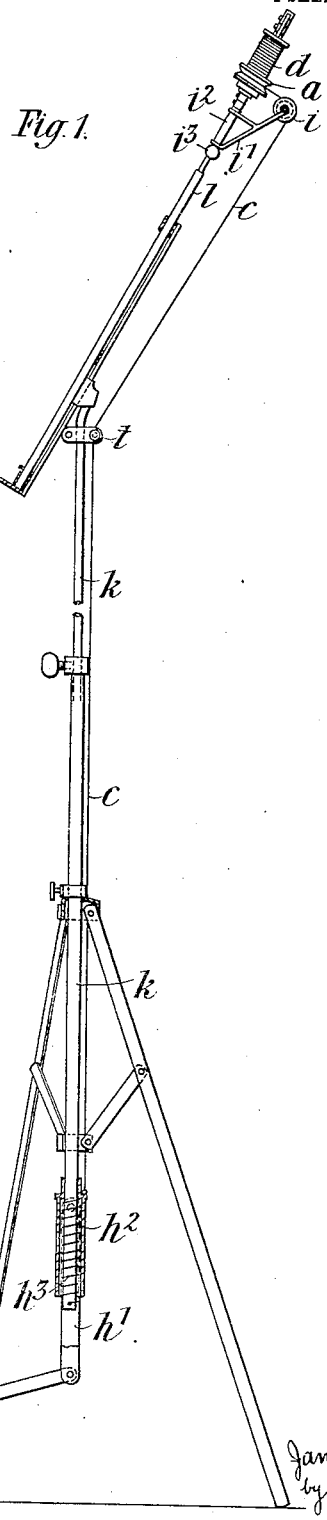

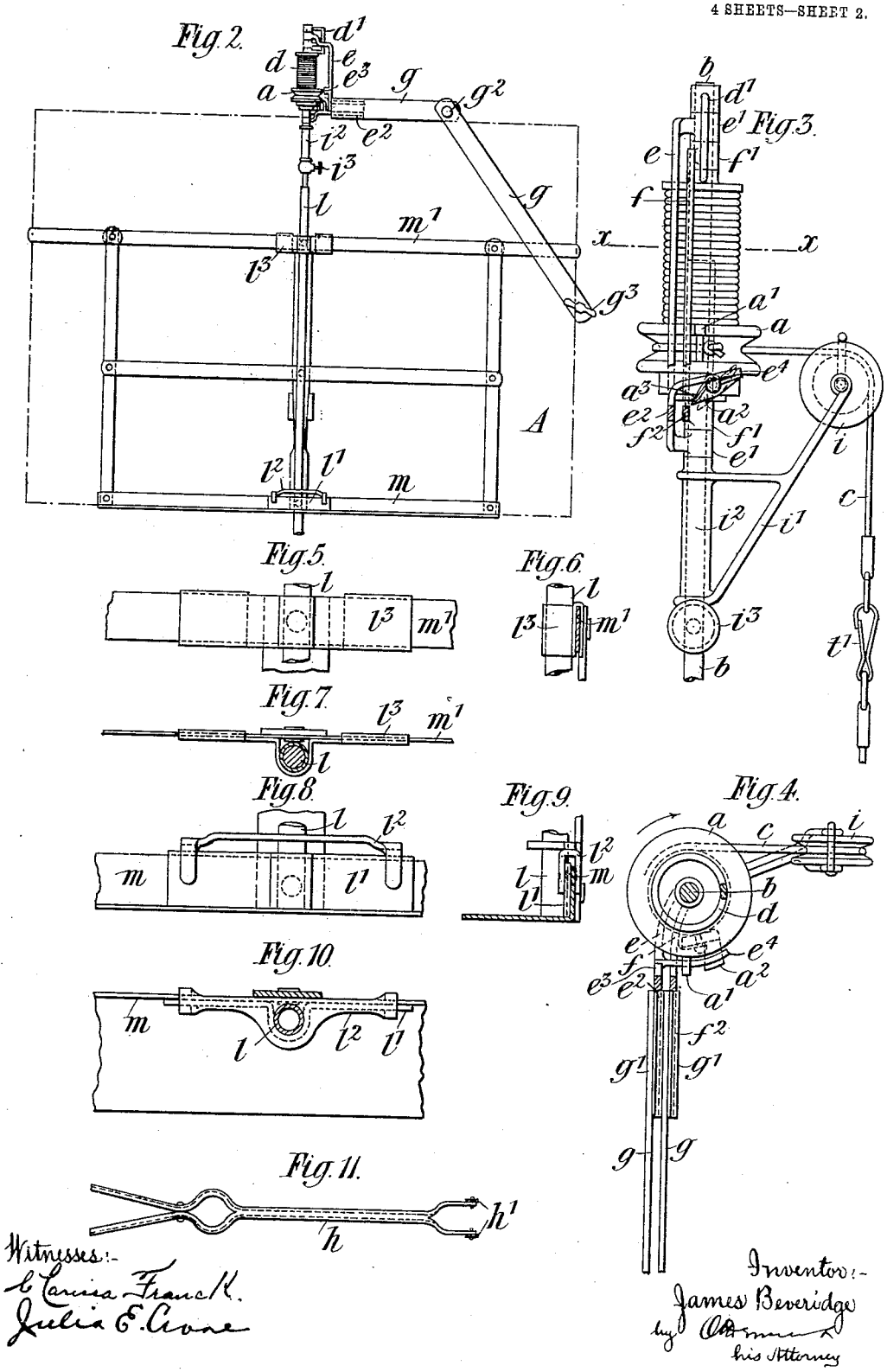

J. BEVERIDGE.
APPARATUS FOR TURNING OVER LEAVES.
APPLICATION FILED AUG. 22, 1908.

No. 910,777. Patented Jan. 26, 1909.
4 SHEETS—SHEET 3.

Witnesses
Louise Franck.
Julia E. Crane

Inventor:
James Beveridge
by his Attorney

J. BEVERIDGE.
APPARATUS FOR TURNING OVER LEAVES.
APPLICATION FILED AUG. 22, 1908.
910,777.
Patented Jan. 26, 1909.
4 SHEETS—SHEET 4.
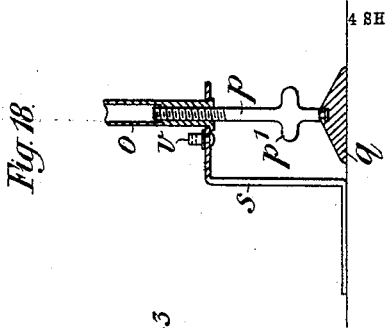
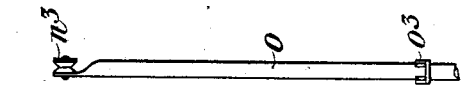
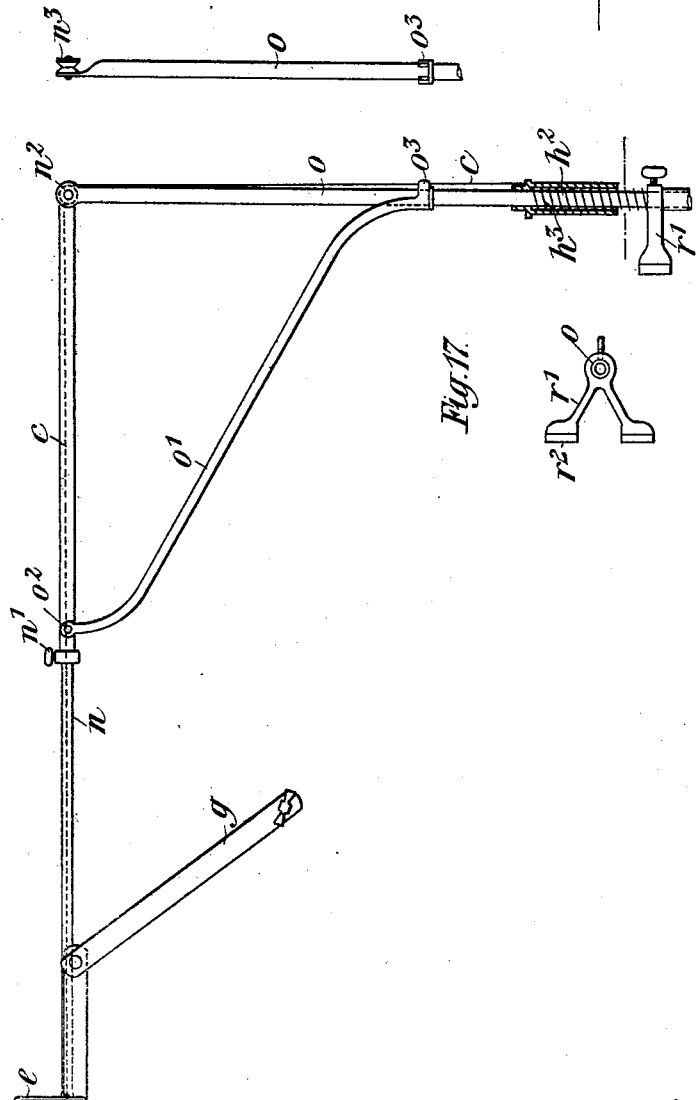
Witnesses:
Inventor:
James Beveridge
by his Attorney

UNITED STATES PATENT OFFICE.

JAMES BEVERIDGE, OF GLENALMOND, SCOTLAND.

APPARATUS FOR TURNING OVER LEAVES.

No. 910,777.  Specification of Letters Patent.  Patented Jan. 26, 1909.

Application filed August 22, 1908. Serial No. 449,839.

*To all whom it may concern:*

Be it known that I, JAMES BEVERIDGE, a subject of His Majesty the King of Great Britain, residing at Trinity College, Glenalmond, Perth, North Britain, engineer, have invented certain new and useful Improvements in Apparatus for Turning Over Leaves; and I do hereby declare the following to be a full, clear, and exact description of the invention, such as will enable others skilled in the art to which it appertains to make and use the same.

This invention relates to apparatus for turning over leaves of music and the like, of that class or type wherein turning arms adapted to engage the leaves and pivoting on a spindle at their inner ends are successively turned through a half circle by successive rotations of a spring returned cord operated pulley, said pulley, or its axis, carrying a striker which engages in succession the turning arms aforesaid.

My invention is designed to simplify and improve the construction of such apparatus, also to render the same capable of being applied to a music stand, pianoforte or the like, without requiring the stand or instrument to be altered or adapted for its reception; further my apparatus may be folded or stowed in a very small compass.

My invention and the manner of operating the same will be clearly understood from the annexed drawings in which similar letters refer to corresponding parts in all the figures, and wherein:—

Figure 12:
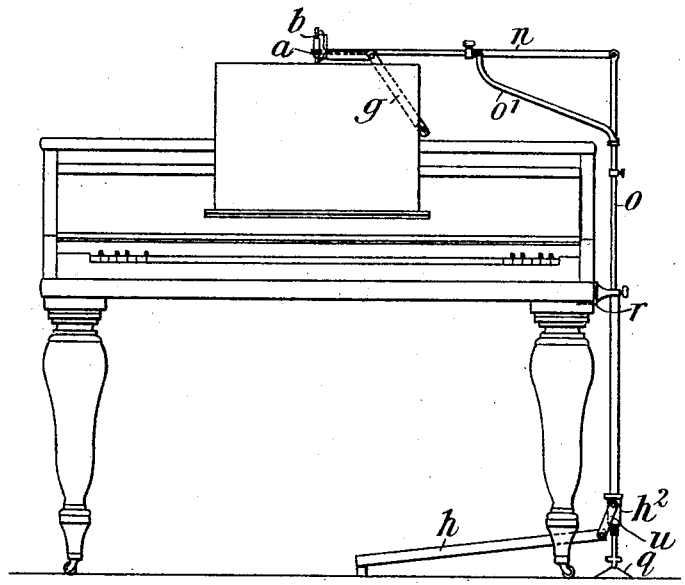
Figure 13:
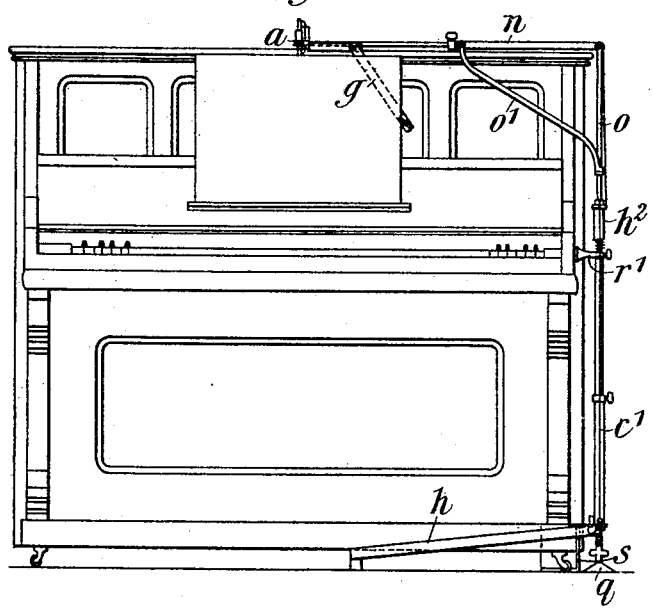
Figure 14:
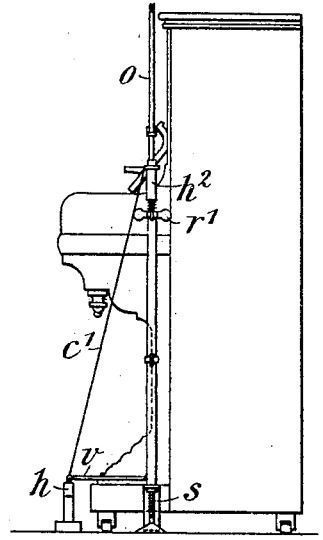

Figure 1 is a side elevation of an ordinary folding music stand having my invention applied thereto. Fig. 2 is a front elevation of the upper part or desk of Fig. 1. Fig. 3 is an enlarged side view of the upper part of the turning apparatus. Fig. 4 is a horizontal section on line $x$—$x$ Fig. 3. Figs. 5 to 11 are details hereinafter referred to. Figs. 12 and 13 show the application of the invention to a grand and an upright pianoforte respectively. Fig. 14 is an end view of Fig. 13. Fig. 15 is a front view of the turner and its supporting bracket on a larger scale, and Figs. 16–18 are details hereinafter referred to.

$a$ is a grooved pulley rotatably mounted on the spindle $b$ and revolved in one direction by pulling a cord $c$ secured to it against the stress of a helical spring $d$ which returns the pulley $a$ when the cord is released to its original position, a suitable stop checking such return movement of the pulley.

$d'$ is a rod or wire leading upwards from a disk to which the upper end of spring $d$ is fastened and then bent inwardly at right angles and entering a hole in the top of the spindle $b$, its function being to hold spring $d$ against rotation on spindle $b$ and further to serve as a stop or abutment as will hereinafter appear.

$e\ f$ are wire carrier frames, the inturned horizontal arms of which are respectively secured to collars $e'\ f'$ freely mounted on spindle $b$ so that said carrier frames may be turned around the axis of the said spindle. Each frame is furnished with a pair of horizontal outwardly extending members $e^2\ f^2$ which detachably fit within sockets $g'$ provided to the leaf turning arms $g\ g$, preferably of transparent celluloid which are jointed at $g^2$ and carry at their free ends suitable clips $g^3$ to engage the edges of the leaves A to be turned, see Fig. 2. These arms are thus adjustable to any size of music sheet and may if required be crossed over the page without obscuring the notes of the music thereon.

In Figs. 2, 3 and 4, the carrier frames $e\ f$ are shown in position ready for the turning operation, resting against the stop or abutment provided by the rod $d'$ before referred to. When the cord $c$ is pulled, a projection $a'$ of pulley $a$ engages a projection $e^3$ of carrier frame $e$ the rotation of the pulley causing the said carrier frame and its turning arm $g$ to describe a half circle and thus turn over the first leaf. Said projection $a'$ preferably extends at right angles from a pin which holds the end of cord $c$ to pulley $a$, see Fig. 3. The turning of the other carrier frame $f$ to effect the turning of the next leaf is effected by the trip $a^2$ pivoted to periphery of boss of pulley $a$. This trip $a^2$ is normally pressed downwards to engage behind the lower inturned horizontal portion of frame $f$, as shown by the dotted lines Fig. 3, by a suitable spring $a^3$, when however both carrier frames are in the position shown, before any turning operation, the rotation of the pulley $a$ to turn the first leaf causes the tail of trip $a^2$ to engage the under surface of the inclined releasing arm $e^4$ provided to frame $e$, this raises the point of the trip clear of frame $f$ so that it moves past the same during the turning of frame $e$, but on the next forward revolution of pulley $a$, the trip, no longer meeting incline $e^4$, engages frame $f$ which is thereby caused in turn to traverse a half circle and so effect the turning of another leaf. It is obvious that if desired the projection $a'$ on pulley $a$ might be dispensed with and trip $a^2$ caused to engage a projection on carrier frame $e$ so as to operate both the carrier frames. I prefer however to employ the projection $a'$ as above described.

The cord $c$ is operated by a treadle $h$, Fig. 1, preferably constructed by splitting a tube, as seen in Fig. 11; one end of this treadle rests on the floor and its other forked end is connected by links $h'$ with a sleeve $h^2$ sliding on the lower end of the stand pillar $k$ and drawn downwards against the stress of the helical spring $h^3$ whereof the lower end may be inturned and kept in place by inserting it into the small hole usually found in the lower end of the pillar $k$ and occupied by a stop pin which is removed; the cord $c$ is secured to this sleeve $h^2$, said cord first passing over the guide pulley $i$, Fig. 3, mounted in the bracket $i'$ extending from the sleeve $i^2$ which is adjustable around and vertically of spindle $b$ by set screw $i^3$. From pulley $i$ the cord $c$ passes over another guide pulley carried by a clamp $t$ (Fig. 1) detachably fixed to stand pillar $k$, and from thence goes to sleeve $h^2$. Preferably the cord $c$ would be in two portions, one portion having loops at suitable intervals apart and the other portion having a hook $t'$ (Fig. 3) to engage any desired loop, this permits the total length of the cord $c$ to be adjusted to compensate for raising and lowering of the desk of the stand, final adjustment being secured by adjusting the telescopic stand itself.

To permit the device to be applied to an ordinary music stand without requiring any alteration or adaptation of the latter I employ the following arrangement:—The foot of spindle $b$ fits without turning within the hollow upper end of a tube or rod $l$ having at its lower end a flat bar or foot $l'$ which is supported on the desk rail and lies flat against the lower bars $m$ of the desk being clamped thereto by the clip $l^2$ forked at each end and slidable on rod $l$, Figs. 8, 9 and 10. $l^3$ is another clip also slidable on rod $l$, which when pushed down embraces the upper bars $m'$ of the music desk and so retains the rod $l$ firmly in position, Figs. 5, 6 and 7. It will be noted that no alteration whatever is required to be made in the stand.

In the application of the invention to a pianoforte, Figs. 12–18, the spindle of the turner proper in lieu of fitting within a vertical rod such as $l$, Fig. 2, is mounted within the forked end of a horizontal telescopic tube $n$, Fig. 15, adjustable to desired length by nut $n'$, said tube $n$ being hinged at $n^2$ to the vertical pillar $o$ and supported extended by the strut $o'$ hinged to it at $o^2$ and having at its lower end a forked clip $o^3$ which embraces pillar $o$ and rests on a shoulder or abutment thereof. Pillar $o$ is made telescopic and vertically adjustable. The foot of this pillar is internally screw threaded (in practice an internally screw threaded bush would be inserted) and receives a screw spindle $p$ whereof the lower end turns freely in a base $q$ resting on the floor, said spindle $p$ being rotated by a disk or handles $p'$, see Fig. 18. By turning spindle $p$ to raise pillar $o$ the apparatus is firmly pressed and held against the pianoforte as will be explained.

In Fig. 12 pillar $o$ carries an L-shaped bracket $r$, which may be lined with felt or rubber, and engages the angle of the pianoforte case; on screwing up pillar $o$ by spindle $p$ this bracket will firmly grip the casing.

In Figs. 13 and 14 the upper horizontal member of an angular bracket $s$, Fig. 18, rests on a shoulder at the lower end of pillar $o$ (such as a flange on the lower end of the bush above mentioned), while its lower horizontal member is firmly held beneath the frame of the pianoforte, as by means of a suitable wedge or small block of wood.

$r'$ is a rest secured to pillar $o$, see Figs. 13 and 17, and preferably faced with felt or rubber $r^2$. This rest bears on the side of the pianoforte case. The bracket $s$ has a certain amount of spring or give, so that when pillar $o$ is raised by screw $p$ the effect will be to press the rest $r'$ firmly against the side of the pianoforte.

The operating cord $c$ traverses the interior of the telescopic arm $n$ and passing over pulley $n^3$, Fig. 16, carried by pillar $o$, is led to a spring controlled sliding sleeve $h^2$ such as described with reference to Fig. 1, this sleeve being in turn operated from a convenient pedal $h$.

In Fig. 12 the spring controlled sleeve is located near the foot of pillar $o$ and pedal $h$ operates it by links $u$. In Figs. 13 and 14 the said sleeve $h^2$ is shown as located higher up the pillar $o$ and operated by a cord $c'$ connecting it with the pedal $h$. $v$ is a radius rod or link pivoted at one end to bracket $s$ and at the other end to pedal $h$.

When the apparatus is not required for use the clip end $o^3$ of strut $o'$ is disengaged from pillar $o$ when the arm $n$ and its appurtenances will hang vertically out of the way at the side of the instrument.

I have only shown the apparatus as provided with two carrier frames and turning arms, as to employ more would render the same complicated and expensive, and in ordinary cases this is quite sufficient, turning over a 6 page piece of music.

I wish to be understood that I do not confine or limit myself to the precise constructional details described and illustrated which may obviously be varied without departing from my invention.

What I claim and desire to secure by Letters Patent of the United States is:—

1. Apparatus of the class or type set forth, comprising a fixed spindle, a spring returned cord operated pulley mounted revolubly but without longitudinal movement thereon, turning arms pivotally connected with the pulley spindle, means carried by the pulley for engaging and turning one of said arms, and separate means carried by the pulley for engaging and turning the other arm, substantially as set forth.

2. Apparatus of the class or type set forth, comprising a fixed spindle, a spring returned cord operated pulley revolubly mounted thereon, carriers pivotally connected with the pulley spindle, turning arms detachably secured to said carriers, means carried by the pulley for engaging and turning one of said arms, and separate means carried by the pulley for engaging and turning the other arm, substantially as set forth.

3. Apparatus of the class or type set forth, comprising a fixed spindle, a spring returned cord operated pulley revolubly mounted thereon, a pair of carriers pivotally connected with the pulley spindle and having turning arms detachably secured to them, a spring controlled trip carried by the pulley, and an incline provided upon the front carrier which engages said trip and holds it clear of the rear carrier while the front carrier is being turned, substantially as set forth.

4. Apparatus of the class or type set forth, comprising a fixed spindle, a spring returned cord operated pulley revolubly mounted thereon, a pair of carriers pivotally connected with the pulley spindle, turning arms detachably secured to said carriers, a projection on the pulley whereby the front carrier is engaged, a spring controlled trip carried by the pulley for engaging the rear carrier, and an incline on the front carrier which engages said trip and holds it clear of the rear carrier while the front carrier is being turned, substantially as set forth.

5. Apparatus of the class or type set forth, comprising a music stand, a fixed spindle carried thereby, a spring returned cord operated pulley rotatable on the latter, turning arms pivotally connected with the pulley spindle, separate engaging means for each arm for successively engaging and turning said arms carried by the pulley, a spring controlled sleeve on the stand pillar to which the pulley cord is led, and a pedal connected with said sleeve substantially as set forth.

6. In apparatus of the class or type set forth, the combination with a music stand of a rod such as $l$, a desk stand having bars clips whereby the rod is detachably secured to the bars of the stand desk, a spindle carrying a cord operated pulley detachably fitted to said rod, turning arms pivotally connected with said spindle, and means carried by the pulley for engaging and turning said arms when the pulley is rotated, substantially as set forth.

7. Apparatus of the class or type set forth, comprising a fixed spindle a music stand carrying the spindle, a spring returned cord operated pulley rotatable thereon, turning arms pivotally connected with said spindle, separate engaging means for each arm for engaging and turning said arms carried by said pulley a bracket carried by the spindle near the cord operated pulley, a guide pulley for the operating cord carried by the bracket, the latter and said pulley being adjustable in vertical and horizontal planes, a stand pillar a guide for the cord near the top of the stand pillar, and a spring controlled pedal operated sleeve to which the cord is led at the lower end of the stand pillar, substantially as set forth.

8. Apparatus of the class or type set forth, comprising a fixed spindle, a cord operated pulley rotatable thereon, turning arms pivotally connected with said spindle, and separate engaging means for each arm carried by the pulley for successively engaging and turning said arms, said arms being jointed and composed of light and strong transparent material such as transparent celluloid, substantially as set forth.

9. Apparatus of the class or type set forth, comprising a spindle, a cord operated pulley rotatable thereon, turning arms pivotally connected with said spindle, means carried by the pulley whereby the arms are engaged and turned, a horizontal arm at one end of which the pulley spindle is held, a vertical pillar to which said horizontal arm is attached at its other end, a base, an adjusting screw between the latter and the vertical pillar, and means carried by the latter which when the same is elevated by the screw firmly engages a pianoforte case, substantially as set forth.

10. Apparatus of the class or type set forth, comprising a spindle, a cord operated pulley rotatable thereon, turning arms pivotally connected with the pulley spindle, means carried by the pulley whereby the arms are engaged and turned, a horizontal arm carrying the said spindle at one end, a vertical pillar to which the other end of the horizontal arm is connected, a base, an adjusting screw between the latter and the vertical pillar, an angular bracket whereof the upper horizontal member is secured to the lower end of the vertical pillar while its lower horizontal member is held down to the floor, and a rest carried by the vertical pillar to bear against the side of a pianoforte, all arranged to operate substantially as set forth.

In testimony whereof I have hereunto set my hand in the presence of two witnesses.

JAMES BEVERIDGE.

Witnesses:
JOHN C. HIGGINS,
ALLAN BAXTER.